Dec. 23, 1958   E. J. SIMANEK   2,865,472
CLASP BRAKE
Filed Aug. 16, 1954   2 Sheets-Sheet 1
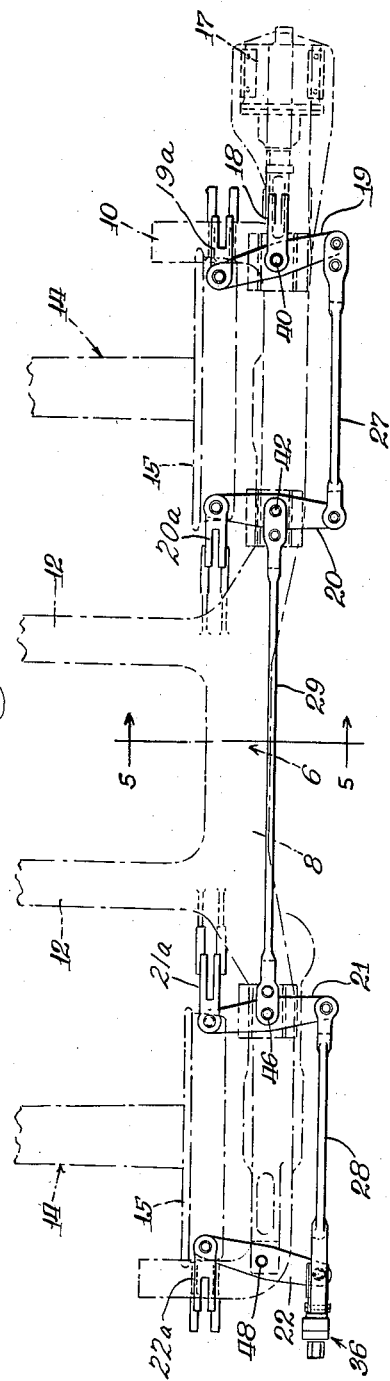
INVENTOR.
Edward J. Simanek
BY Dec. 23, 1958　　　　E. J. SIMANEK　　　　2,865,472
CLASP BRAKE Filed Aug. 16, 1954　　　　　　　　　　　　　　2 Sheets-Sheet 2

INVENTOR.
Edward J. Simanek
BY
Orrin O. B. Horner
Atty.

2,865,472

Patented Dec. 23, 1958

2,865,472

CLASP BRAKE

Edward J. Simanek, Chicago, Ill., assignor to American Steel Foundries, Chicago, Ill., a corporation of New Jersey Application August 16, 1954, Serial No. 449,907

7 Claims. (Cl. 188—56)

This invention relates to railway brake rigging and more particularly to a rigging commonly known as clasp brakes wherein brake heads and brake shoes are applied to opposite sides of each car wheel.

An object of my invention is to provide an improved and more efficient linkage arrangement of the conventional power clasp brake system for use in the modern railway car trucks.

Another object is to design a clasp brake arrangement that will permit a rapid yet smooth braking engagement at high speeds.

Another object is to provide for a brake linkage that is simple in design, is easily accessible for installation and repair, and does not interfere with the operational functions of the wheel and axle assembly.

Still another object of the invention is to provide a design of a clasp brake with a novel arrangement of live and dead levers to transmit power from the cylinder.

These and other objects of the invention will become apparent from an examination of the following description and drawings, wherein:

Figure 1 is a fragmentary top plan view of a railway car truck embodying the invention, only one half being shown inasmuch as the brake arrangement is similar on the opposite side of the truck;

Figure 2 is a fragmentary side elevational view of the structure shown in Figure 1;

Figure 5:
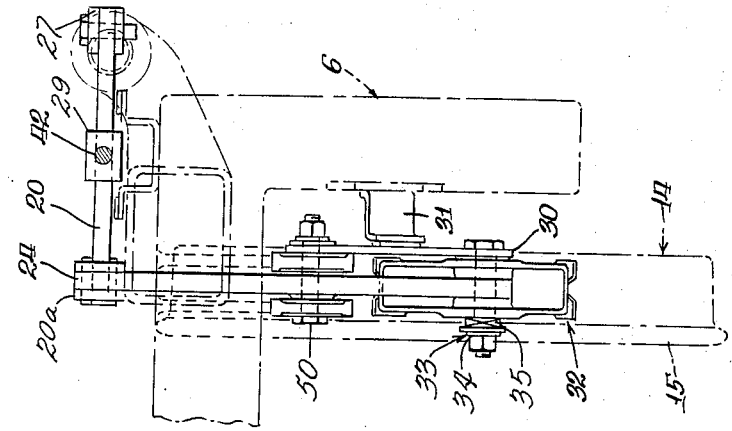
Figure 5 is a sectional view of the structure shown in Figure 1 taken along line 5—5.
Figure 4:
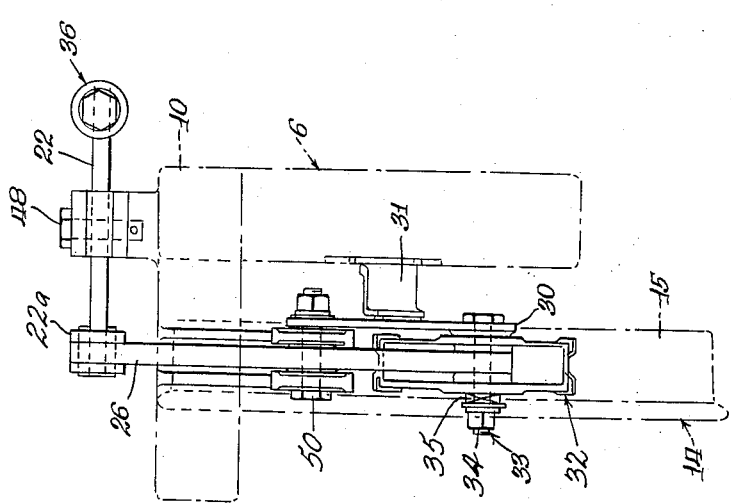
Figure 4 is a fragmentary end view taken from the left as seen in Figures 1 and 2.
Figure 3:
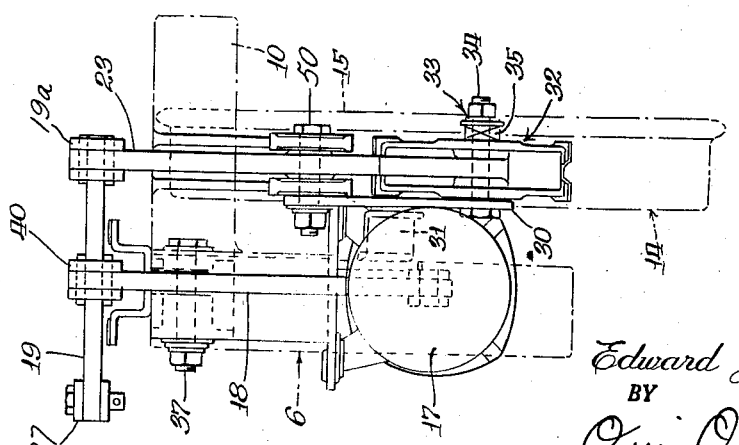
Figure 3 is a fragmentary end view taken from the right as seen in Figures 1 and 2.

As will be seen from the drawing, the truck frame, generally designated 6, comprising side rails 8, 8, end rails 10, 10, and transoms 12, 12, is conventionally supported by wheel and axle assemblies 14, 14 having wheels 15 disposed inboardly of side rails 8. Mounted to the frame 6 longitudinally of the truck, at one corner thereof, is power cylinder 17 which is operatively connected to the lower end of vertical dead cylinder lever 18, said lever being fulcrumed intermediate the ends thereof as at 37 on frame 6, and having at the upper end thereof an operative connection 40 with a horizontal live actuating lever 19 intermediate the ends thereof, said actuating lever 19 at the inboard end thereof having a movable connection 19a interconnecting lever 19 and the upper end of vertical brake lever 23, and at the outboard end thereof being pivotally connected to the pull rod 27, said pull rod 27 having the opposite end thereof pivotally connected to the outboard end of horizontal live actuating lever 20, said actuating lever 20 having at the opposite, or inboard end thereof, a movable connection 20a interconnecting lever 20 and the upper end of vertical brake lever 24, and being pivotally connected intermediate the ends thereof to one end of a horizontal connecting rod 29 at pivot 42. The other end of said rod 29 is pivotally connected to horizontal live actuating lever 21 intermediate the ends thereof at pivot 46, said actuating lever 21 having at the inboard end thereof a movable connection 21a interconnecting lever 21 and the upper end of a brake lever 25, and at the outboard end thereof a pivotal connection with one end of a pull rod 28, the other end of said pull rod being pivotally connected to the outboard end of horizontal dead actuating lever 22 and also having at the same end thereof a conventional slack adjusting device 36 secured thereto. Said actuating lever 22 is fulcrumed intermediate the ends thereof on the frame 6 at pivot 48 and has at the inboard end thereof a movable connection 22a interconnecting lever 22 and the upper end of vertical brake lever 26. All four brake levers 23, 24, 25, and 26 have similar construction and function, and each is fulcrumed to the frame intermediate the ends thereof at pivot 50 and disposed adjacent related brake guide 31, said guide being mounted to frame 6. Each brake lever carries at the lower end thereof a brake head assembly 32 engageable with wheel 15, said assembly also being supported from the frame by a hanger 30. At the pivotal connection between the brake lever, hanger and break head assembly a non-rattling device 33 is provided, comprising pin 34 and spring 35, said device serving to maintain the brake lever, shoe assembly and hanger in close connection.

It will be noted that the power cylinder 17 operates in conjunction with similar power means at opposite sides of the truck to actuate brake mechanism at each side of the car.

In operation, as power cylinder 17 is energized, it actuates the lower end of the dead cylinder lever 18 in a clockwise direction, as seen in Figure 2, about pivot 37 on the frame 6. This action carries connected live lever 19 generally to the right as seen in Figure 1. As the horizontal live actuating lever 19 is being pulled toward the right, two actions take place, the inboard end of the actuating lever 19 movably connected to the upper end of the vertical dead brake lever 23 causes the said brake lever 23 to move clockwise, as seen from Figure 2, about pivot 50 thereby causing the lower end of said lever 23, carrying brake head assembly 32, to engage wheel 15, almost simultaneously the outboard end of lever 19 is pulling the end of pull rod 27, to which it is pivotally connected, to the right. The pull rod 27, in turn, being pivotally connected at its other end to the outboard end of the second actuating lever 20, pulls said end causing the lever to turn in a counterclockwise direction about floating pivot 42. The inboard end of said lever 20 actuates the connected brake lever 24 about its pivot 50 bringing the related brake head assembly into engagement with the wheel. Almost simultaneously, with this action, actuating lever 20 pulls connecting rod 29 to the right, the live horizontal actuating lever 21, being pivotally connected intermediate the ends thereof to the opposite end of the connecting lever 29, is actuated and, in turn, actuates its respective brake lever 25 and pull rod 28 in the same manner as actuating lever 19 actuated related brake lever 23 and pull rod 27. Pull rod 28, in turn, being pivotally connected to the outboard end of dead actuating lever 22 causes it to pivot counterclockwise about fulcrum 48 on the frame 6, causing brake lever 26, to which its opposite end is movably connected, to pivot about pivot 50 and thereby bring its brake head assembly into engagement with the related wheel.

Slack adjusting device 36 being operatively secured to pull rod 28 serves to take up slack within the system when necessary. Also non-rattling device 33 on the brake shoe assembly serves to keep its associated connections secure and free from vibrations and rattles.

It is to be understood that all of the action and reaction in the several operational steps of the braking action occur almost simultaneously, thereby providing a smooth evenly functioning brake mechanism. Release of the power means causes the various parts to operate in directions reverse to those just described until the several parts have assumed their normal inoperative position.

I claim:

1. In a clasp brake arrangement for a railway car truck, wheel and axle assemblies, a frame supported thereby, power means mounted on one corner of said frame, braking means for the wheels at one side of the truck comprising first, second and third horizontal live actuating levers, a vertical dead cylinder lever operatively connected at the lower end thereof to said power means and having its upper end directly connected to said first live horizontal actuating lever intermediate the ends of said actuating lever, a rod pivotally connecting said second and third actuating levers intermediate their respective ends, a horizontal dead actuating lever fulcrumed intermediate the ends thereof on said frame and adjacent said third live actuating lever, a pull rod pivotally interconnecting the first and second actuating levers at the outboard ends thereof, another pull rod connecting the other two actuating levers at the outboard ends thereof, four dead brake levers fulcrumed intermediate the ends thereof to the frame on opposite sides of their respective wheels and having their upper ends connected to the inboard ends of their respective actuating levers, brake shoe assemblies and brake hangers carried by said brake levers at the lower ends thereof, non-rattling devices each comprising a pin and spring serving to secure said brake shoe assemblies and hangers to said brake levers, and a slack adjusting device operatively connected to last mentioned pull rod.

2. In a brake arrangement for a railway car truck, spaced wheel and axle assemblies, a frame supported thereby, power means carried by said frame at one corner thereof, braking means for the wheels at one side of the truck comprising friction means disposed on opposed sides of each wheel serving to engage and clasp the wheel to decelerate the truck, vertical brake levers carried by the frame and carrying said friction means, horizontal live and dead actuating levers operatively carried by the frame and movably connected to said brake levers, a vertical dead lever directly connecting the power means to one of said live actuating levers intermediate the ends of the latter, and rods operatively interconnecting said actuating levers, the fulcrum of the dead actuating lever, the fulcrum of the dead actuating lever, the longitudinal axis of said power cylinder, the vertical dead lever and certain of said rods being disposed in a common vertical plane extending longitudinally of the truck.

3. In a linkage interconnecting a power source and the brake shoe assemblies for wheels along one side of a railway car truck, two pair of vertical brake levers carrying said brake shoe assemblies to engage opposed sides of their respective wheels, one dead and three live horizontal actuating levers arranged along one side of the truck, each actuating lever being connected at its inboard end to its respective brake lever, a connecting rod pivotally interconnecting adjacent intermediate live actuating levers intermediate their ends, two pull rods interconnecting the end actuating levers with their adjacent intermediate actuating levers at their outboard ends, a dead vertical cylinder lever directly interconnecting the end live actuating lever intermediate its ends to the power source, and slack adjusting means operatively associated with said linkage.

4. In a clasp brake arrangement for wheels along one side of a railway car truck, spaced wheel and axle assemblies, a frame supported thereby, power means operatively carried by said frame at one corner thereof and spaced adjacent one of the wheel and axle assemblies, friction assemblies associated with and engageable with opposed sides of each wheel, brake levers operatively supported by the frame and carrying said friction assemblies, a first live horizontal actuating lever extending in a direction generally transverse of the truck and disposed adjacent said power means, said actuating lever having at its inboard end a movable connection with one of the brake levers, a vertical dead cylinder lever pivotally mounted on said frame and connecting the medial portion of said actuating lever to the power means, a second horizontal live actuating lever spaced from said first live actuating lever and having at its inboard end a movable connection with another of said brake levers, a third horizontal live actuating lever spaced from and parallel to the second actuating lever and having at its inboard end a movable connection with another of said brake levers, a fourth horizontal dead actuating lever spaced from and parallel to the third actuating lever and having at its inboard end a movable connection with still another of said brake levers, a pull rod connecting the outboard ends of the first and second actuating levers, another pull rod connecting the outboard ends of the third and fourth actuating levers, and a connecting rod connecting the second and third actuating levers intermediate their respective ends.

5. In a clasp brake arrangement for a railway car truck, a combination including a plurality of wheel and axle assemblies, a frame supported thereby, brake shoe assemblies disposed on opposed sides of and engageable with each wheel along one side of said truck, vertical brake levers carrying said shoe assemblies for engagement with opposed sides of their respective wheels, horizontal actuating levers including one dead lever and three live levers connected at the inboard ends thereof to said brake levers, pull links connecting the outboard ends of the actuating levers which are disposed on opposite sides of each wheel, a rod connecting the medial portions of the actuating levers which are disposed between the said wheels, a slack adjusting device associated with one of said pull links, a power means on said frame at one corner thereof, a vertical dead lever directly connecting said cylinder to the adjacent one of said live actuating levers intermediate the ends of the latter.

6. In a railway car truck, wheel and axle assemblies, a frame supported thereby, braking means for wheels on one side of the truck comprising vertical brake levers carrying friction means positioned on opposite sides of the wheels, actuating levers connected to respective brake levers, one of said actuating levers being a live lever, a power source, a dead cylinder lever connected to the power source, a direct connection between said cylinder lever and the live lever intermediate the ends of the live lever, connection means joining the actuating levers, certain of said connection means interconnecting the actuating levers intermediate their ends, and means associated with the actuating levers whereby action of the power source is transmitted to the brake levers, the longitudinal axis of said power source, said direct connection, said dead cylinder lever and said certain connection means being disposed in a common vertical plane extending longitudinally of the truck.

7. In a brake arrangement for a railway car truck, wheel and axle assemblies, a frame supported thereby, power means mounted on one corner of the frame, breaking means for the wheels at one side of the truck comprising first, second and third horizontal live actuating levers, a vertical dead cylinder lever connected at its lower end to said power means and having its upper end connected directly to said first live actuating lever intermediate the ends of the latter, a rod pivotally connecting the second and third live actuating levers intermediate their ends, a horizontal dead actuating lever fulcrumed intermediate its ends to the corner of the frame adjacent the third live actuating lever, a pull rod connecting the outboard ends of the dead actuating lever and said third live actuating lever, another pull rod interconnecting the outboard ends of the first and second live actuating levers, vertical brake levers pivoted intermediate their ends to the frame, brake shoe assemblies pivoted to the lower ends of said brake levers and being engageable with said assemblies, said brake levers having their upper ends connected to the inboard ends of the dead actuating lever and said first, second, and third live actuating levers, the first-mentioned rod, the longitudinal axis of the power means, and the fulcrum of the dead actuating lever being disposed in a common vertical plane extending longitudinally of the truck.

References Cited in the file of this patent

UNITED STATES PATENTS

| | | |
|---|---|---|
| 2,110,992 | Holloway | Mar. 15, 1938 |
| 2,148,362 | Aurien | Feb. 21, 1939 |
| 2,191,138 | Baselt | Feb. 20, 1940 |
| 2,230,605 | Aurien | Feb. 4, 1941 |
| 2,237,509 | Tack | Apr. 8, 1941 |
| 2,238,744 | Mueller | Apr. 15, 1941 |
| 2,276,336 | Pflager | Mar. 17, 1942 |
| 2,280,754 | Flesch | Apr. 21, 1942 |